(12) United States Patent
Kwon

(10) Patent No.: US 9,242,603 B2
(45) Date of Patent: Jan. 26, 2016

(54) CONTROL METHOD FOR AROUND VIEW STOP MODE

(71) Applicant: Hyundai Mobis Co., Ltd., Seoul (KR)

(72) Inventor: Yang Woo Kwon, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 14/181,010

(22) Filed: Feb. 14, 2014

(65) Prior Publication Data

US 2015/0066237 A1 Mar. 5, 2015

(30) Foreign Application Priority Data

Sep. 5, 2013 (KR) .................. 10-2013-0106667

(51) Int. Cl.
*B60R 1/00* (2006.01)
*H04N 7/18* (2006.01)

(52) U.S. Cl.
CPC *B60R 1/00* (2013.01); *H04N 7/181* (2013.01); *B60R 2300/404* (2013.01)

(58) Field of Classification Search
None
See application file for complete search history.

(56) References Cited

U.S. PATENT DOCUMENTS

| | | | | |
|---|---|---|---|---|
| 8,766,816 | B2 * | 7/2014 | Takatsudo et al. | 340/903 |
| 2005/0171663 | A1 * | 8/2005 | Mittelsteadt et al. | 701/35 |
| 2013/0002877 | A1 * | 1/2013 | Miyoshi et al. | 348/148 |
| 2014/0218529 | A1 * | 8/2014 | Mahmoud et al. | 348/148 |
| 2014/0280177 | A1 * | 9/2014 | Ishii et al. | 707/740 |
| 2015/0066237 | A1 * | 3/2015 | Kwon | 701/1 |

FOREIGN PATENT DOCUMENTS

| | | |
|---|---|---|
| JP | 2006-55028 A | 3/2006 |
| JP | 2011-2884 A | 1/2011 |
| JP | 2011-16484 A | 1/2011 |
| JP | 2011-141442 A | 7/2011 |
| JP | 4816923 B2 | 11/2011 |
| JP | 2012-51391 A | 3/2012 |
| WO | PCT/JP2012/065221 | 6/2012 |

OTHER PUBLICATIONS

"Around View Monitor," Nissan Technological Development Activities, retrieved on Jun. 29, 2015 from http://www.nissan-global.com/EN/TECHNOLOGY/OVERVIEW/avm.html.
Korean Office Action mailed Aug. 6, 2014 in counterpart Korean Application No. KR 10-2013-0106667 (4 pages, in Korean).

* cited by examiner

*Primary Examiner* — Thomas Tarcza
*Assistant Examiner* — Richard Goldman
(74) *Attorney, Agent, or Firm* — NSIP Law

(57) ABSTRACT

Disclosed is a control method for an around view stop mode. A control method for an around view stop mode in an around view monitoring system, including a plurality of cameras provided on an exterior of a vehicle to photograph a situation outside the vehicle, a monitor provided inside the vehicle to output images photographed by the cameras, a door opening sensor provided on one side of a vehicle door to check whether the door is opened or closed, and an around view mode operating switch operating an around view mode while stopping, includes stopping the vehicle; changing a gear to a P state or a parking brake to a brake-on state; and outputting the images from the monitor.

12 Claims, 3 Drawing Sheets

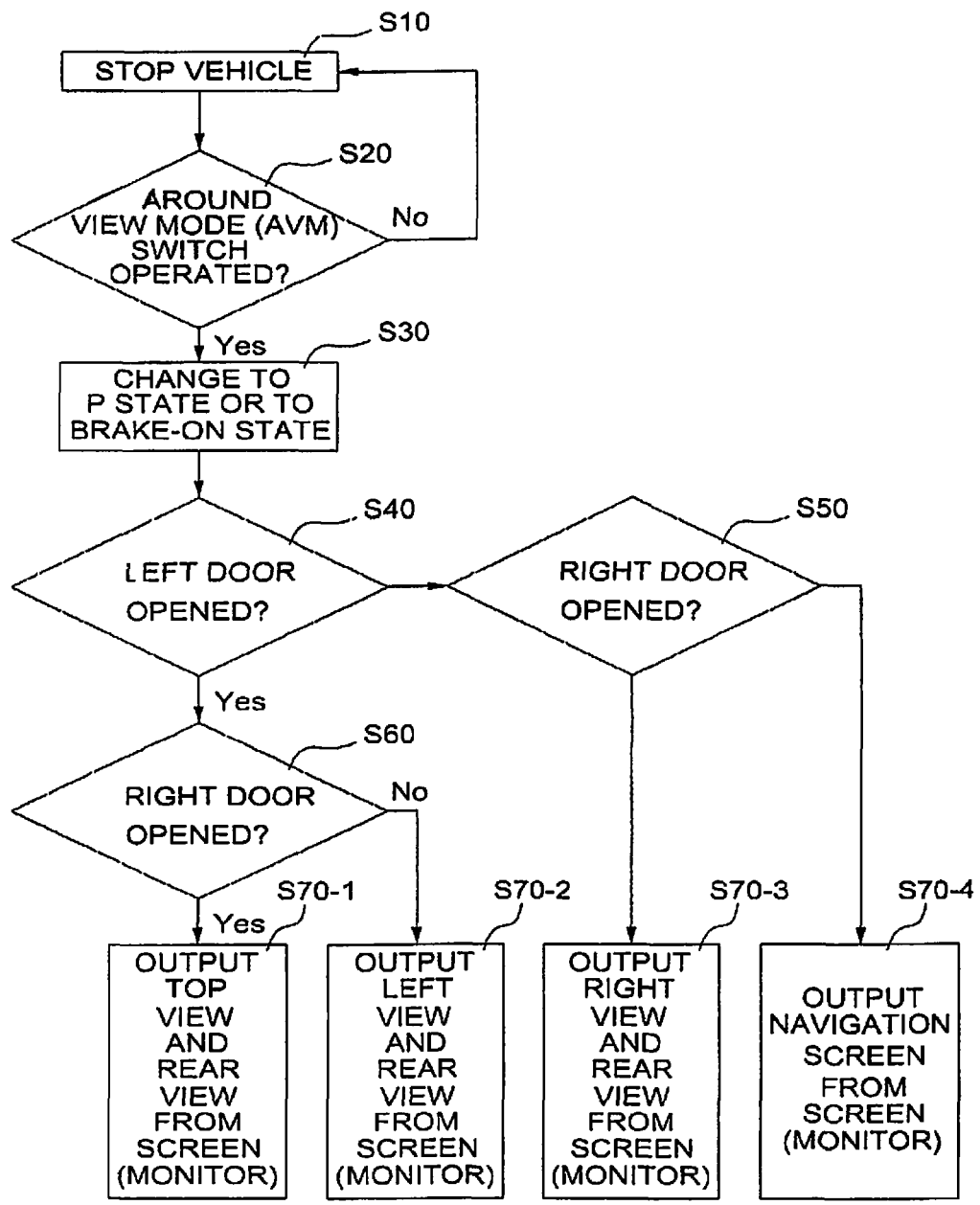

CONTROL METHOD FOR AROUND VIEW STOP MODE

CROSS-REFERENCE TO RELATED APPLICATION

This application claims priority to and the benefit of Korean Patent Application No. 10-2013-0106667 filed in the Korean Intellectual Property Office on Sep. 5, 2013, the entire contents of which are incorporated herein by reference.

TECHNICAL FIELD

The present invention relates to a control method that allows side and rear views to be shown in a stop mode of a vehicle, and more particularly, to a control method that allows side and rear views to be shown in a stop mode of a vehicle, which is provided with a camera on an exterior of a vehicle and a monitor outputting an image photographed by the camera in the vehicle so as for an occupant to check an obstacle factor outside the vehicle through the monitor in the vehicle and thereafter, safely get off the vehicle when a gear of the vehicle is in a P state or a parking brake is in a brake-on state.

BACKGROUND OF THE INVENTION

In general, an around view monitoring system of a vehicle generally has a structure in which when an around view mode is operated while the vehicle stops, a situation outside the vehicle, which is photographed by a plurality of cameras provided on an exterior of the vehicle is transmitted to a monitor in the vehicle to obtain a view outside the vehicle and safely stop the vehicle in a parking space.

However, in the around view monitoring system, when a gear of the vehicle is changed to a P, or park gear, state or a parking brake is changed to a brake-on state, it is regarded that the stop of the vehicle is completed and the around view mode ends, and as a result, a safety accident may occur by an obstacle factor outside the vehicle when an occupant gets off the vehicle. As will be understood, such P state is among those states of motion of the vehicle such as a driving gear state, reverse gear state and neutral state, as respectively referred to hereinafter as a, "D," "R," or "N" state.

SUMMARY OF THE INVENTION

Exemplary embodiments of the present invention are provided for a control method for an around view stop mode that outputs an image outside a vehicle on a screen, in order to determine an obstacle outside a door before an occupant gets off the vehicle by allowing side and rear views to operate at the time of opening a vehicle door so as to prevent a safety accident due to a factor outside the vehicle when an occupant gets off the vehicle.

An exemplary embodiment of the present invention provides a control method for an around view stop mode in an around view monitoring system, including a plurality of cameras provided on an exterior of a vehicle to photograph a situation outside the vehicle, a monitor provided inside the vehicle to output images photographed by the cameras, a door opening sensor provided on one side of a vehicle door to check whether the door is opened or closed, and an around view mode operating switch operating an around view mode while stopping, including: stopping the vehicle; changing a gear to a P state or a parking brake to a brake-on state; and outputting the images from the monitor.

In this case, the around view mode includes a stop mode, the stop mode is operated when the gear of the vehicle is in the P state or the parking brake is in a brake-on state, in the stop mode, a getting-on/off view screen is output onto the monitor when it is sensed that the door of the vehicle is opened by the door opening sensor and a navigation screen is output onto the monitor when the door of the vehicle is not opened.

In this case, the getting-on/off view screen allows a left view and a rear view to be output onto the monitor when a left door is opened, the getting-on/off view screen allows a right view and the rear view to be output onto the screen when a right door is opened, and the getting-on/off view screen allows a top view and the rear view to be output onto the screen when both left and right doors are opened.

The monitor is formed to be positioned at the center between the driver seat and a passenger seat, the cameras are formed to measure front, rear, and lateral sides of the vehicle, and the door opening sensor is formed on one side of the door so as to check whether the door is opened or closed.

According to exemplary embodiments of the present invention, a control method for an around view stop mode is provided, in which in a case where door opening is sensed by a door opening sensor when a gear of a vehicle is in a P state or a parking brake is in a brake-on state, a left view and a right view, a top view, and a rear view are output onto a screen to allow an occupant to effectively determine a situation outside a vehicle before the occupant gets off a stopped vehicle.

BRIEF DESCRIPTION OF THE DRAWINGS

FIG. 2 is a flowchart illustrating a control method for an around view stop mode according to an exemplary embodiment of the present invention.

DETAILED DESCRIPTION OF THE EMBODIMENTS

Hereinafter, exemplary embodiments of the present invention will be described in detail with reference to the accompanying drawings.

Figure 1A:
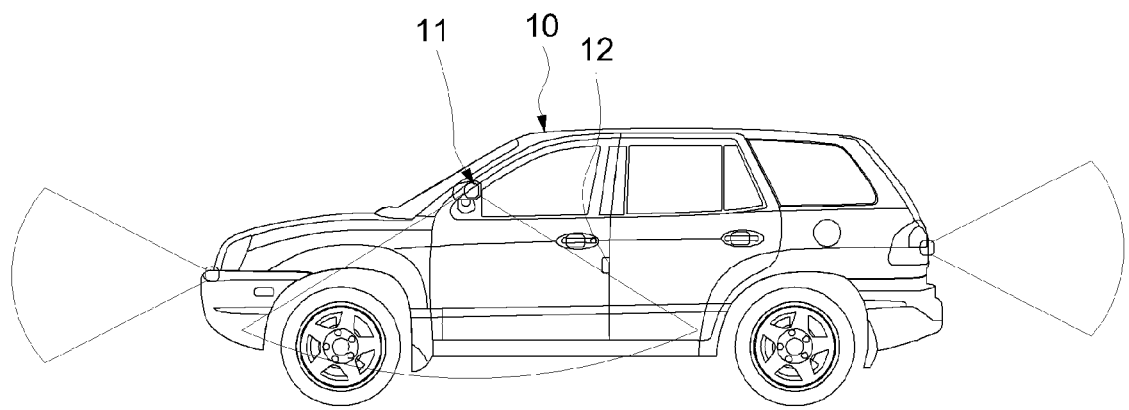
FIG. 1A is a perspective view illustrating the positions of a camera unit and a door opening sensor outside a vehicle according to an exemplary embodiment of the present invention.

FIG. 1A is a perspective view illustrating the positions of a camera unit and a door opening sensor outside a vehicle according to an exemplary embodiment of the present invention.

Figure 1B:
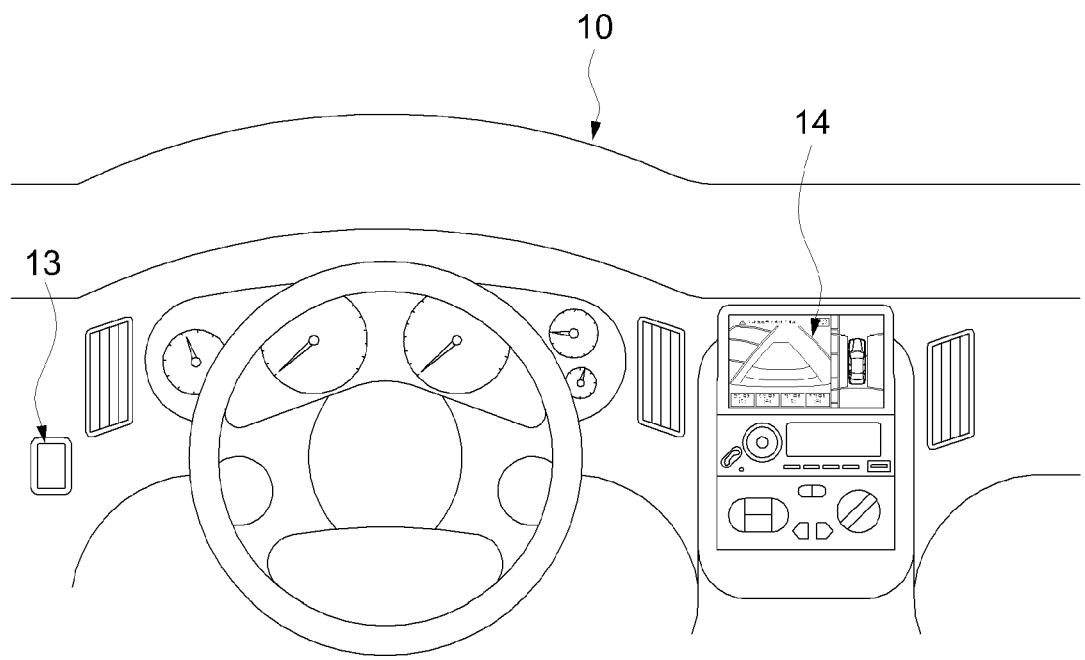
FIG. 1B is a perspective view illustrating the positions of an around view mode switch and a screen in the vehicle according to the exemplary embodiment of the present invention.

FIG. 1B is a perspective view illustrating the positions of an around view mode switch and a screen in the vehicle according to the exemplary embodiment of the present invention.

Referring to FIGS. 1A and 1B, in the control method for an around view stop mode, a camera 11 may be provided on an exterior of a vehicle 10 and a door opening sensor 12 may be included in one side of a vehicle door.

The camera 11 is provided on a front side, a rear side, and lateral sides outside the vehicle 10 and may photograph the exterior of the vehicle 10.

In this case, the camera 11 may adopt a superangle lens so as to photograph a maximum wide location, and flection may occur on a screen photographed by the lens due to a wide view angle, and images are composited so as to make the flection be shown flat and the composite image is transmitted to a monitor.

Meanwhile, the camera 11 is provided on the exterior of the vehicle 10, and a camera cover member may be formed on one side of the camera 11 so as to prevent the camera 11 from being damaged due to external impacts.

In this case, the camera cover member keeps a state in which a cover is closed so as to protect the camera 11 when the vehicle 10 is driven at a predetermined speed or more, and the cover member may be opened when the occupant intends to check the exterior of the vehicle 10 by using the camera 11.

The door opening sensor 12 is provided on one side of the door and may check whether the door is opened or closed.

A type of the door opening sensor 12 is not limited. For example, the door opening sensor 12 may be formed to sense an opening/closing state of the door by the pressure of the door of the vehicle 10 and may be formed to sense the opening/closing state of the door by the position of the door of the vehicle 10.

Meanwhile, the door opening sensor 12 senses whether the door is opened or closed to transmit the sensed opening/closing state to a monitor 14 to be described below.

In the around view mode, images photographed by the cameras 11 attached on front, rear, and lateral sides of the vehicle 10 are transmitted to the monitor to easily stop the vehicle 10.

In this case, an around view mode switch 13 is provided inside the vehicle 10, and when the occupant intends to operate the around view mode, the occupant presses the switch to operate the around view mode. However, a method of operating the around view mode by pressing a button is not limited. For example, the around view mode switch 13 may be operated by a rotary plug or the around view mode switch 13 may be operated by a touch panel. However, in FIG. 1B, a pressurized button is provided for easily understanding the present invention.

Meanwhile, when the around view mode switch 13 is operated, the camera 11 photographs a situation outside the vehicle 10 and the photographed images may be transmitted to the monitor 14.

The monitor 14 may be provided inside the vehicle 10 so as for the occupant to check the image photographed by the camera 11 with his/her naked eyes.

In detail, the monitor 14 is formed to be positioned at the center between a driver seat and a passenger seat to allow both a driver and an occupant who sits on the passenger seat to monitor the monitor 14.

Meanwhile, the monitor 14 may serve as a navigation display that may display a path guide for general driving and may show a screen of the exterior of the vehicle 10 photographed by the camera 11 when entering the around view mode.

FIG. 2 is a flowchart illustrating a control method for an around view stop mode according to an exemplary embodiment of the present invention.

Referring to FIG. 2, a control method for an around view stop mode includes stopping (S10), changing a gear to a P state or a parking brake to a brake-on state (S30), and outputting an image from a monitor (S70-1, S70-2, S70-3, and S70-4).

In the act of stopping (S10), an occupant operates an around view mode by pressing an around view mode switch 13 in order to stop a vehicle 10, and when the around view mode is operated, an image photographed by a camera 11 provided on an exterior of the vehicle 10 is output to a monitor 14 to safely stop the vehicle 10.

In the changing of the gear to the P state or a parking brake to the brake-on state (S30), when the gear of the vehicle 10 of which stopping is completed is changed to the P state or the parking brake is used, the around view mode may be switched to a stop mode.

In detail, when the gear of the vehicle 10 is positioned at a D, R, or N state, the around view mode is operated so as to easily stop the vehicle and when the gear of the vehicle 10 is positioned at the P state or the parking brake is used, the around view mode is changed to the stop mode to operate.

In this case, in the stop mode, when it is sensed that the door of the vehicle 10 is opened by a door opening sensor 12, a getting-on/off view screen may be output from the monitor 14, while when the opening of the door of the vehicle 10 is not sensed, a navigation screen may be output onto the monitor 14.

A detailed stop mode may be operated by four methods including outputting a top view and a rear view from the monitor (S70-1), outputting a left view and the rear view from the monitor (S70-2), outputting a right view and the rear view from the monitor (S70-3), and outputting the navigation screen from the monitor (S70-4).

The outputting of the top view and the rear view from the monitor 14 (S70-1) occurs when opening of a left door (S40) and opening of a right door (S60) are sensed by a door opening sensor 12 for the door of the vehicle 10, and the top view to check left and right situations of the vehicle 10 and the rear view to check a rear situation of the vehicle 10 may be output on the monitor 14.

The outputting of the left view and the rear view from the monitor 14 (S70-2) occurs when the opening of the left door (S40) is sensed, but the opening of the right door (S60) is not sensed by the door opening sensor 12 for the door of the vehicle 10, and the left view to check the left situation of the vehicle 10 and the rear view to check the rear situation of the vehicle 10 may be output on the monitor 14.

The outputting of the right view and the rear view from the monitor 14 (S70-3) occurs when the opening of the left door (S40) is not sensed, but the opening of the right door (S60) is sensed by the door opening sensor 12 for the door of the vehicle 10, and the right view to check the right situation of the vehicle 10 and the rear view to check the rear situation of the vehicle may be output on the monitor 14.

The outputting of the navigation screen from the monitor 14 (S70-4) occurs when the opening of the left door (S40) is not sensed and the opening of the right door (S50) is not also sensed by the door opening sensor 12 for the door of the vehicle 10, and it is determined that an occupant does not get on or off the vehicle 10 to output an existing navigation screen.

As described above, exemplary embodiments of the present invention have been described, but it will be appreciated by those skilled in the art that the present invention may be modified and changed in various ways by the addition, change, deletion or addition of constituent elements without departing from the spirit of the present invention described in the claims, and that the modifications and changes are included in the claims of the present invention.

What is claimed is:

1. A control method for an around view stop mode in an around view monitoring system, the method comprising:

in the around view monitoring system comprising cameras provided on an exterior of a vehicle to photograph a situation outside the vehicle, a monitor provided inside the vehicle to output images photographed by the cameras, a door opening sensor provided on a side of a vehicle door to sense whether the door is opened or closed, and an around view mode operating switch operating an around view mode while motion of the vehicle is stopped so that the vehicle is in a stopped state, stopping the vehicle; and upon changing a gear of the vehicle to a P state or a parking brake of the vehicle to a brake-on state, outputting the images on the monitor.

2. The method of claim 1, wherein the around view mode comprises a stop mode corresponding to the stopped state of the vehicle.

3. The method of claim 2, wherein the stop mode is operated when the gear of the vehicle is in the P state or the parking brake is in a brake-on state.

4. The method of claim 2, wherein in the stop mode, a getting-on/off view is output onto the monitor when it is sensed that the door of the vehicle is opened by the door opening sensor.

5. The method of claim 2, wherein in the stop mode, a navigation view is output onto the monitor when it is not sensed that the door of the vehicle is opened by the door opening sensor.

6. The method of claim 4, wherein the getting-on/off view allows a left view and a rear view of respectively corresponding areas surrounding the vehicle to be output onto the monitor when a left door is opened.

7. The method of claim 4, wherein the getting-on/off view view allows a right view and a rear view of respectively corresponding areas surrounding the vehicle to be output onto the monitor when a right door is opened.

8. The method of claim 4, wherein the getting-on/off view view allows a top view and a rear view, each of which views are perceived relative to respectively corresponding areas surrounding the vehicle, to be output onto the monitor when both left and right doors are opened.

9. The method of claim 1, wherein the around view mode operating switch is provided at a side of a driver seat in the vehicle.

10. The method of claim 1, wherein the monitor is disposed at a centered position between the driver seat and a passenger seat.

11. The method of claim 1, wherein the cameras are configured to measure front, rear, and lateral sides of the vehicle.

12. The method of claim 1, wherein the door opening sensor is disposed at a side of the vehicle door so as to sense whether the door is opened or closed.

* * * * *